(12) United States Patent
Bolduc

(10) Patent No.: US 7,545,121 B2
(45) Date of Patent: Jun. 9, 2009

(54) AUXILIARY VEHICLE POWER SUPPLY

(76) Inventor: Scott A. Bolduc, 6141 Crestmont Dr., Baton Rouge, LA (US) 70809

( * ) Notice: Subject to any disclaimer, the term of this patent is extended or adjusted under 35 U.S.C. 154(b) by 0 days.

(21) Appl. No.: 11/304,859

(22) Filed: Dec. 15, 2005

(65) Prior Publication Data

US 2006/0125443 A1    Jun. 15, 2006

Related U.S. Application Data

(60) Provisional application No. 60/636,222, filed on Dec. 15, 2004.

(51) Int. Cl.
*H02J 7/06* (2006.01)
(52) U.S. Cl. .................... 320/163; 320/104; 320/136
(58) Field of Classification Search ............... 320/116, 320/126, 163, 104, 136
See application file for complete search history.

(56) References Cited

U.S. PATENT DOCUMENTS

| | | | |
|---|---|---|---|
| 5,939,861 A * | 8/1999 | Joko et al. ............... | 320/122 |
| 6,741,065 B1 * | 5/2004 | Ishii et al. ............... | 320/122 |
| 6,777,945 B2 * | 8/2004 | Roberts et al. ........... | 324/426 |
| 7,058,484 B1 * | 6/2006 | Potega .................... | 700/297 |

* cited by examiner

*Primary Examiner*—Akm Enayet Ullah
*Assistant Examiner*—Aaron Piggush
(74) *Attorney, Agent, or Firm*—Patricia M. Mathers

(57) ABSTRACT

A multiple-battery charging system for enabling a vehicle with an internal-combustion engine or hybrid engine to be equipped with a plurality of electric storage batteries. The multiple-battery charging system automatically connects batteries to load, at times alternatingly and at times in parallel. All batteries are charged, together or seriatim, and maintained in a charged state, by a single conventional charging source (alternator) with which the vehicle is equipped. In abnormal operating circumstances, such as when one or more batteries are defective or shorted, or the alternator is defective, the multiple-battery charging system prevents an operator from depleting a battery to the point where necessary peripheral equipment, such as a wheelchair lift, can no longer be operated.

8 Claims, 5 Drawing Sheets

AUXILIARY VEHICLE POWER SUPPLY

BACKGROUND OF THE INVENTION

1. Field of the Invention

The present invention relates to a battery back-up system. In particular, the invention relates to such a system for vehicles powered by internal combustion engines, including hybrid vehicles.

2. Prior Art

The need of vehicles powered by internal combustion engines for reserve electric-energy-storage capacity has been recognized practically as long as such vehicles have been in existence. Initially, the need was felt on cold mornings when the vehicle's stock battery proved insufficient to start its engine. Later on, the need became more general, as vehicles were loaded with peripheral equipment requiring electrical energy and presenting the potential for draining the vehicle battery to the point where it was incapable of starting the engine. This problem arose as soon as vehicles were equipped with such peripherals as lights that could be operated with the engine off, but has become more acute in recent decades as the peripheral equipment added to vehicles began to include sophisticated technical apparatus that require significant amounts of power, such as, for example, electrical wheelchair lifts and related equipment. With vehicles so equipped, the concern arises that the single storage battery will run down to the point where it can neither operate the wheelchair lift or start the engine. This is of particular concern, because it is possible that an operator can enter his or her vehicle, only to become stranded (trapped) there without enough battery power to either start the vehicle or operate the wheelchair lift.

The solution of simply adding a second battery to the vehicle has been around for a long time, particularly in regions that experience extreme cold. By connecting two 12-volt batteries in parallel, one can usually ensure adequate energy availability even when low temperatures have reduced the effectiveness of the batteries. A variant on this solution is to carry to the vehicle a supplemental battery that will supply the electric energy needed to start the engine when the on-board battery has become incapable of doing so because of malfunction, because peripheral equipment was left on and drained the battery, or because the air temperature is −40°. In this latter approach, the supplemental battery is temporarily connected in parallel with the on-board battery and the engine started. With the engine started, the supplemental battery is disconnected, and the car's engine-driven generator ("alternator" in its modern embodiment) eventually brings the on-board battery up to its fully charged state. It is possible to remove the supplemental battery even before the vehicle's own battery is fully charged because, once the engine is operating, the alternator not only provides all of the power needed for the devices associated with the vehicle, but has enough left over to charge the on-board battery. It is for this reason that the on-board battery is sometimes referred to as the "starter battery," since that is usually all that it is needed for, apart from providing low levels of electric power for the radio and other minor peripheral equipment. With the engine operating, the alternator supplies all the car's electrical needs: the electronic ignition system; the lights; the radio; the GPS; the seat heaters; etc.

For definitiveness, the remainder of the discussion of the prior art will refer to a single supplementary or auxiliary battery. It is to be understood, however, that the comments may be equally well directed toward a setup in which multiple batteries serve as supplementary batteries.

Presently, the reliability of the auxliary battery is maintained by maintaining it as a separate entity that is not hard-wired into the vehicle electrical system. The disadvantage of this method is that one has to maintain the auxiliary battery in a charged state, shuttle it back and forth between the vehicle and its storage location, and then hook it up properly to the starter battery.

If all one wished to do was to double the battery capacity, one would simply hardwire the two batteries in parallel. In that case, they would also be in parallel with the alternator, which would charge them together in the same manner and at the same time that the present single on-board battery is charged. This would, however, defeat the purpose of the dual battery as a back-up system. To serve that purpose, the two batteries must be able to be isolated from one another at certain times.

Another problem with having two batteries that are isolated from one another is that there will regularly be times at which one or the other battery will be significantly discharged with respect to the other. Specifically, a fully charged "12-volt" lead storage battery will develop approximately 13.6 volts across its terminals but, when fully discharged, will present a voltage of 10 volts or even lower. Under those circumtances, connecting the batteries in parallel will lead to an extremely high current from the charged battery to the discharged one, current that is wasteful, shortens battery life, and is even potentially dangerous. The high current arises from the fact that by design starter batteries have a very low output impedance, which is desired and needed in normal vehicle operation. The conventional low-impedance starter battery is capable of providing very high current when called on to do so when cranking the engine. Conversely, it is also capable of receiving a charge very rapidly, indeed, as fast as the alternator can charge it.

What is needed then is a battery back-up system that permits the incorporation into a motor vehicle of a plurality of batteries, each battery capable of being used independently of the other(s), in such a manner that each battery is maintained and recharged by a single conventional alternator. What is further needed is such a battery back-up system that maximizes the time that both batteries are at or near full charge, whereby at least one of the batteries is maintained at or near full charge at all times. What is yet further needed is such a system that requires no intervention by the vehicle operator, yet nevertheless provides a means for the operator to override the system during exigent circumstances. Finally, what is needed is such a system that can be readily installed in vehicles already on the road, as well as in new vehicles.

BRIEF SUMMARY OF THE INVENTION

The stated needs are met by providing a multi-battery charging system (MBCS) using standard microprocessor circuitry that, based on need and charge state, connects the vehicle load to two or more batteries in such a way that the alternator is sufficient to maintain or re-charge the two or more batteries. In order to achieve this, the MBCS prevents batteries that temporarily have significantly different charge states from being connected together.

It is understood that the invention is not limited to use with just two batteries. Nevertheless, that simple configuration will be assumed here for ease in describing the invention. It is easily seen that the description does not change qualitatively regardless of how many batteries the MBCS coordinates.

For clarity, the batteries in this section will be referred to as the "starter battery" and the "auxiliary battery," although, in fact, there is no functional difference between the batteries and either will be able to serve the function of the other battery. Also, reference is made to "load", which is the vehicle load, including the vehicle engine, the equipment immediately associated with the engine, including the alternator, and all the other electrical peripheral equipment installed on the vehicle and powered by the vehicle electrical system. Examples of such peripheral equipment include a wheelchair lift and associated equipment, an electrical van door opener, a music system, etc. In this section, the charging source in the vehicle will be referred to as the "alternator." This practice, however, is not intended to limit in any way the type of charging source used with this invention.

The crux of the MBCS is its approach to selectively coupling the starter and auxiliary batteries to the alternator, and the manner in which it reacts to the respective charge states of the two batteries. The key component of the MBCS is the circuit placed between the alternator and the batteries, a component referred to hereinafter as the "mediator" because of its function of mediating the connection between the alternator and the respective batteries. The mediator controls when the auxiliary battery or starter battery is connected to the load and, thus, to the alternator.

The standard practice with automotive electrical systems is to ground one side of each electrical device to the vehicle chassis. In a modern vehicle, one side of the alternator is so grounded, as is the negative terminal of the vehicle battery. This means, among other things, that when the other alternator terminal is connected to the positive terminal of the vehicle battery, the alternator is connected directly across the battery. Stated otherwise, the battery and alternator are connected in parallel. When the mediator of the present invention is connected to the vehicle, one side of the mediator circuit will also be grounded to the chassis, as will the negative terminal of the second battery, obviating the need to have two input terminals on the mediator. In short, nothing is "floating" and all of the circuit digrams can be drawn with just a single lead connecting the different components.

Unlike the conventional charging system of the stock vehicle, in which the vehicle load, including the alternator, is connected across the starter battery, the MBCS of the present invention places a mediator device between the load and the starter battery. For purposes of definitiveness, the connection between the load and the mediator is said to take place at the alternator terminal on the mediator. The mediator also has a number of battery terminals, the number corresponding to the number of batteries included in the MBCS. In this system of two batteries, one terminal connects to the starter battery and the other to the auxiliary battery. The primary function of the mediator is to monitor the voltage level of each battery and to automatically connect one or both batteries to load, depending on the voltage levels of the batteries. The mediator has three independent voltage monitoring circuits, one for each battery that is connected to the MBCS, and one for the alternator. The mediator continuously monitors the voltage of each battery and the alternator. Thus, it knows at all times, what the state of the alternator is and which battery or batteries are to be switched to or isolated from the load.

When one battery is used to start the engine, the mediator automatically isolates that battery from the load, once it has been recharged to an Upper Threshold Value and holds that voltage level for a pre-determined period of time, and switches in a previously isolated second battery. Once that second battery is charged to the Upper Threshold Value and holds a voltage level corresponding to the Upper Threshold Value for the pre-determined period of time, the mediator switches both batteries in parallel. Under normal operating circumstances, the first battery will have lost little or no charge, thus, the batteries will be at the same voltage level when switched in parallel.

In a two-battery embodiment, the mediator has three switch states. In SWITCH STATE ONE, the alternator is connected to the starter battery alone, with the auxiliary battery isolated; in SWITCH STATE TWO, the alternator is connected to the auxiliary battery alone, with the starter battery isolated; in SWITCH STATE THREE, the alternator is connected equally to both batteries, which are then charged concurrently by the alternator. When one or the other of the batteries is isolated, it maintains the charge state it had when isolation began, assuming that it is not defective in some way.

The load for the peripheral equipment is also connected to the vehicle power system. Although increased vehicle load as a result of ever more peripheral equipment being connected to the vehicle electrical system is one of the things driving the invention, the peripheral equipment itself is not directly connected to the MBCS of the invention, but rather, is connected to the vehicle electrical system in the conventional manner. The simplest embodiments of the charging system require that the low-voltage side of each device, that is, the negative terminal of the auxiliary battery, the low side of the mediator, and the low sides of all devices of the peripheral equpiment be grounded to the vehicle chassis, just as the negative terminal of the starter battery is grounded.

Normal Operation of the MBCS: The following is a description of the normal operation of the MBCS. Discussions of abnormal operating conditions will follow. When the engine is off, the mediator is in its default state, SWITCH STATE ONE. In this state, the starter battery is connected to the vehicle load (and provides power to all those peripheral devices that require power even when the vehicle is not running) and the auxiliary battery isolated from the load. It is expected that the starter battery will be at full charge at this time, having been completely charged following the start-up process. The auxiliary battery is also expected to be at full charge, for reasons discussed below. The engine is started, then, with the mediator in SWITCH STATE ONE, which process partially depletes the starter battery. Once the engine has started, the mediator remains in SWITCH STATE ONE and recharges the battery. Once the starter battery reaches a threshold voltage of 13.2 V and holds that charge for a predetermined period of time, such as two and one-half minutes, the mediator switches to SWITCH STATE TWO, in which it isolates the starter battery from the load and switches the auxiliary battery to the load. The auxiliary battery is now charged by the alternator, with the mediator monitoring its charge. Once the auxiliary battery has reached the threshold charge of 13.2 Volts and holds that charge for two and one-half minutes, the mediator checks the voltage of the starter battery. If the starter battery has maintained its charge (>/=12 V), the MBCS switches to SWITCH STATE THREE. Now the starter battery and the auxiliary battery are switched in parallel to the load. The MBCS remains in SWITCH STATE THREE for as long as the engine is running and both batteries are charging equally. When the vehicle is switched off, the MBCS defaults to SWITCH STATE ONE, with the starter battery connected to load and the auxiliary battery isolated. At this time, both batteries are fully charged.

Switching between SWITCH STATE ONE and SWITCH STATE TWO: In normal operation, the only time the starter battery is needed to meet the full vehicle load demands is when the engine is started. Once started, the alternator provides the power to operate the various systems and devices. The starter battery continues to play an important role after the engine is started, namely to accommodate occasional short term high current loads, and to buffer the alternator output. The electronic devices so prevalent in modern motor vehicles are susceptible to over-voltages, and can burn out in a fraction of a second. Since the standard alternators, though designed to produce a steady dc voltage, can occasionally send out a high-voltage spike, it is necessary to add something to the circuit to prevent that spike from developing. A large capacitor connected across the alternator output serves this purpose and the standard automotive storage battery is such a capacitor. To ensure that no high-voltage spikes are generated when connecting and disconnecting the batteries to the load, the mediator uses a "make-before-break" sequence in switching the batteries. In particular, it performs this switching so that for a fraction of a second, both batteries are connected across the vehicle load. The fraction of a second is sufficient to prevent an interval during which neither battery is connected, but short enough so that no significant current can develop between the two batteries while they are connected in parallel. In addition to providing protection to the electronic devices in the vehicle load, this make-before-break approach eliminates arcing at the switch contacts and thus lengthens contact life.

Abnormal Operating Modes: The mediator monitors various voltage thresholds of the load and the batteries. These thresholds vary, depending upon whether or not the vehicle ignition is ON or OFF. For example, the Upper Threshold Value for a battery connected to load is 13.2 V and is 12 V for a battery isolated from the load. There are several abnormal modes in which the batteries do not correspond to pre-programmed conditions that govern the mediator control process. When those abnormal circumstances occur, the mediator notifies the operator through any of a number of visual and audio signals. The primary abnormal modes can be described as follows. SWITCH STATE ONE with ignition ON: starter battery fails to reach full charge, or the auxiliary battery is below the minimum threshold voltage; SWITCH STATE TWO with ignition ON: auxiliary battery fails to recharge, or the starter battery is below the minimum threshold voltage; SWITCH STATE THREE with ignition ON: the load or the charge on either of the two batteries falls below a minimum charge threshold voltage, causing the mediator to isolate one of the two batteries and revert back to SWITCH STATE ONE or two.

These abnormal modes become more numerous when one considers that a battery does not have to be fully charged to perform its function, be it starting the engine or operating a wheelchair lift. Thus a variant abnormal mode is a situation in which the starter battery is run down, but the auxiliary battery, while not fully charged, has sufficient voltage to start the vehicle.

In listing the abnormal modes, the one mode that cannot be remedied using the MBCS of the present invention is the situation in which both batteries are depleted to the point where neither one has sufficient voltage to power the load. Such would be the case if the alternator were defective and the operator had continued to operate the vehicle with both batteries at low voltage levels by manually intervening with the normal operation of the MBCS.

The circuitry of the present invention may include various provisions for operator intervention, depending on the particular nature of the vehicle, and especially the nature of the load. As an illustration, consider that the load includes equipment needed to aid the operator to gain egress from and ingress to the vehicle, such as a wheelchair lift. Consider the needed intervention when the operator, after entering the vehicle, discovers that the starter battery has run down to the point where it cannot start the vehicle. The proper intervention is to override the mediator, shifting it from its normal SWITCH STATE ONE to SWITCH STATE TWO, so that the auxiliary battery starts the engine and thereby enables the alternator to recharge the batteries. The mediator automatically switches back to SWITCH STATE ONE after the auxiliary battery has been recharged, while monitoring the charge state of the starter battery. If the starter battery is charging in a normal manner, the mediator automatically goes to its normal SWITCH STATE THREE. It behooves the operator to have the battery or the electrical system checked out, to determine the reason for the depletion of the starter battery.

DESCRIPTION OF THE PREFERRED EMBODIMENT

Figure 1:
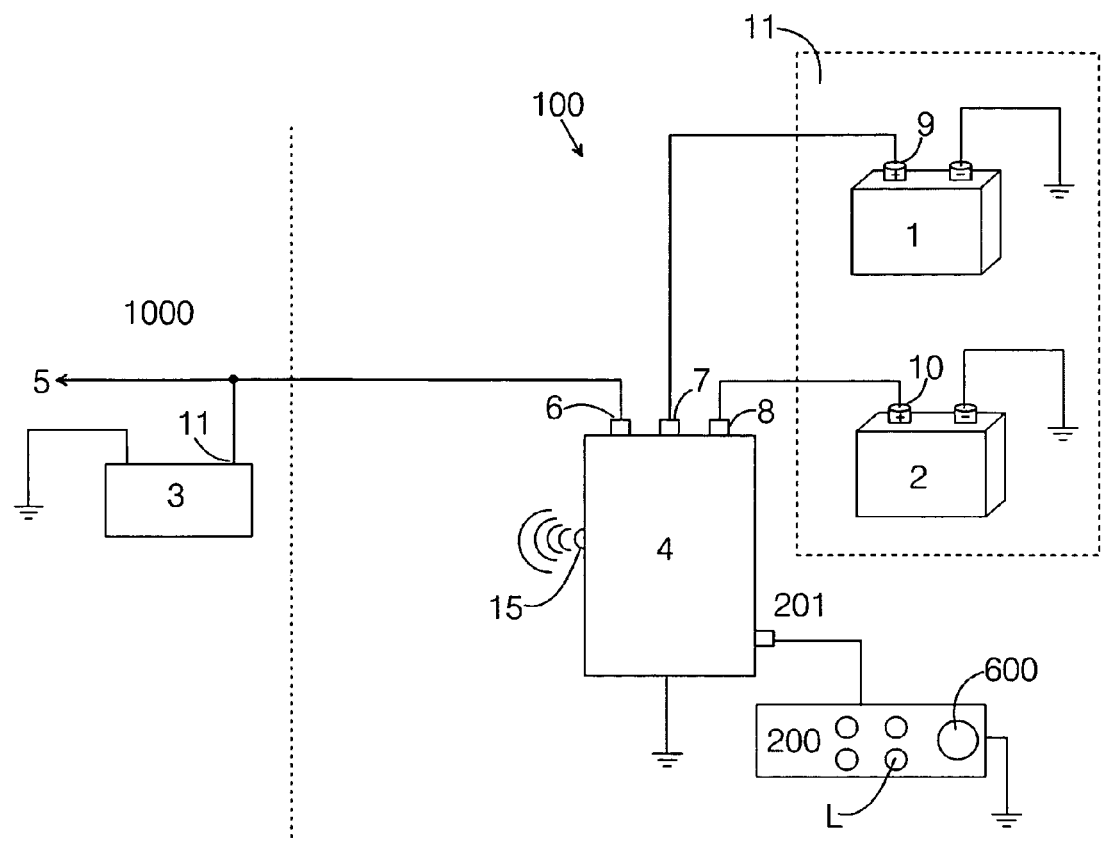
FIG. 1 illustrates schematically the multi-battery charging system according to the invention, showing two batteries connected to the mediator, the keypad/display, and the loads.

FIG. 1 lays out the schematically the elements of a preferred embodiment of a multi-battery charging system (MBCS) 100 for charging and maintaining multiple vehicle storage or starting batteries. The MBCS 100 comprises the following components: a programmable control means or CPU 20 (shown in FIGS. 6, 7, and 8), a plurality of storage batteries 11, a battery switching means or mediator 4, and a keypad/display device 200. The mediator 4 has an alternator terminal 6, a first-battery terminal 7, and a second-battery terminal 8. Vehicle load 1000, which includes load from a charging source 3, as well as from all peripheral equipment connected to the vehicle electrical system, connects to the mediator 4 at the alternator terminal 6. The vehicle load exclusive of the load from the charging source 3 is referred to as a peripherals load 5. The function of the mediator 4 is to switch alternatively one or more of the batteries that are included in the plurality of storage batteries 11 between a charging state and an isolated state or to switch several batteries in parallel to a charging state. The switching to a charging or an isolated state is done according to an algorithm stored in the CPU 20.

For illustration purposes, in the embodiment illustrated hereinafter the plurality of storage batteries 11 includes a first battery 1 with a first-battery positive terminal 9 and a second battery 2 with a second-battery positive terminal 10. The configuration of the MBCS 100 described herein is not intended to be limiting in any way of the scope of the invention, but is relied upon for purposes of illustration and brevity. Rather, it is understood that the plurality of batteries 11 may include two or more storage batteries, depending on the practical application of the MBCS 100. Depending on the number of batteries in the MBCS 100, the mediator 4 may have more than two battery terminals and may be programmed to switch between more than three states. The charging source 3 is typically an alternator or generator. Further, the term "vehicle" as used throughout this description shall include automotive vehicles, marine vessels, and aircraft. It is understood that the batteries in the plurality of batteries 11 are what are conventionally referred to as "starting" batteries with a low impedance to current flow, and are not deep cycle batteries, which have a high impedance to current flow.

When the vehicle ignition is OFF, the mediator 4 is in a default state, referred to sometimes as SWITCH STATE ZERO. In this state, the first battery 1 is connected to the charging source 3 and the vehicle electrical circuits for starting. This first battery 1 is also providing power to those peripheral devices in the vehicle that require power, even when the ignition is OFF, such as the vehicle computer, the clock, the door lock system, etc.

When the ignition is ON, the mediator is capable of switching between three states: a SWITCH STATE ONE, in which the first battery 1 is switched to a charging or operating state, while the second battery 2 is switched to an isolated state; a SWITCH STATE TWO, in which the states of the batteries 1 and 2 are reversed; and a SWITCH STATE THREE, in which both batteries 1 and 2 are switched in parallel to a charging state. SWITCH STATE ZERO mirrors SWITCH STATE ONE with regard to how the batteries 1 and 2 are switched, but, in SWITCH STATE ZERO, the keypad/display device 200 is inactivated and the first battery 1 is not being maintained in a charged state.

Figure 6:
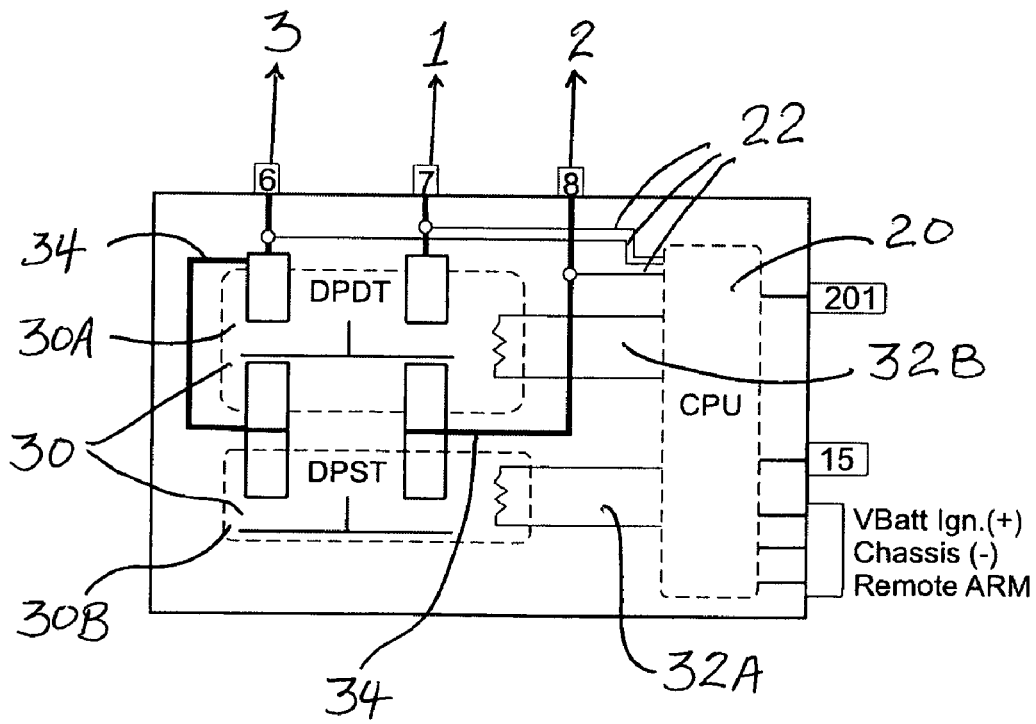
FIG. 6 is a circuit diagram of the mediator.

FIG. 6 is a circuit diagram of the mediator 4 that illustrates the connections between the various components of the system, which include switching contactors 30 and a CPU 20. Referring now to FIGS. 6 and 1: The switching contactors 30 include a first contactor 30A, which is a double-pole double-throw contactor, and a second contactor 30B, which is a double-pole single-throw contactor. The term "contactor" as used herein also includes relays, solenoids, and other contact-making devices. The CPU 20, which holds the programmed instructions for switching and activating the various components of the system, is electronically connected to the ignition circuit VBatt, the charging source terminal 6, the first-battery terminal 7, and the second-battery terminal 8, the keypad/display unit 200, and other components that will be discussed later. Further, monitoring subcircuits 22 periodically and independently check the voltages across the first battery 1, the second battery 2, and the charging source 3. Switching circuits 32 for energizing and de-energizing the contactors 30 are also connected to and controlled by the CPU 20. In this embodiment, the switching circuits 32 include a first switching circuit 32A and a second switching circuit 32B. The techniques for monitoring voltages and energizing contactors are well-known in the art and are not discussed in any detail herein. The information from the monitoring subcircuits 22 is essential to the operation of the algorithm programmed into the CPU 20 for controlling the switching circuits 32A and 32B. The mediator 4 ensures make-before-break contact between the batteries 11 and the contactors 30 to ensure that no arcing or current spikes occur in the electrical system. The first switching contactor 30A is ideally a 2800-Watt contactor in a 12-Volt system and the second switching contactor 30B a 1400-Watt contactor, still assuming a 12-Volt system. Conductors 34 are used to make contact between the contactors 30 and/or the load 1000. As shown, a second contactor 30B serves as a redundant make-before break contactor to the first switching contactor 30A when switching batteries in SWITCH STATE ONE and SWITCH STATE THREE, and a first contactor 30A serves to bus and switch the load 1000. See also FIGS. 7 and 8 for an illustration of these electrical components. In most modern automotive vehicles, the conventional alternator is sufficient to charge two batteries at once, but where this is not the case, the conventional alternator is easily replaced with a conventional one that has this capacity.

As shown in FIGS. 1 and 6, each component of the MBCS 100 is grounded, the ground indicated by the conventional ground symbol. Typically, the grounds are connected to the chassis of the vehicle in which the MBCS 100 is installed. The charging source 3 has a positive terminal 11 that connects to the alternator terminal 6 on the mediator 4. The first-battery terminal 7 connects to the first-battery positive terminal 9 and the second-battery terminal 8 connects to the second-battery positive terminal 10. The keypad/display unit 200 has indicator lights L and and an arming switch 600, also called an intervention means, and is connected on its non-grounded side to the mediator 4 via a keypad/display input 201. The keypad/display unit 200 is a small display device that easily mounts on the dash of a vehicle, or in some location where it is in clear view of the vehicle operator. The unit 200 may be provided with double-sided adhesive, so as to mount easily on a dash in any conventional vehicle. Typically, the mediator 4 is mounted under the glove compartment in the front of the passenger compartment of the vehicle so that it is within 8 feet of the first battery 1 (the starter battery) and 12 feet of the second battery 2 (the auxiliary battery).

Figure 2:
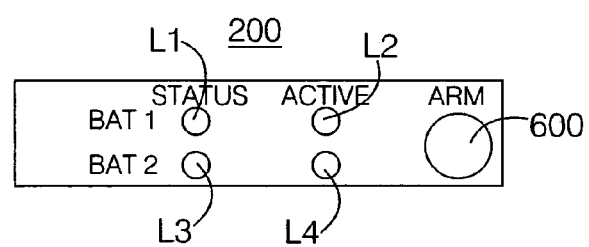
FIG. 2 depicts the keypad/display unit of the preferred embodiment.

FIG. 2 shows the keypad/display 200 in more detail. The indicator lights L on the keypad/display 200 include two status lights designated individually as L1 and L3 and two active lights designated individually as L2 and L4. The two status lights L1 and L3, when activated, illuminate either green G or red R, depending on the status of the particular battery 1, 2. Therefore, each status light L1 and L3 indicates three possible states, unactivated, activated-red, and activated-green. The two active lights L2 and L4 illuminate yellow Y and indicate just two states: unactivated (non illuminated) and activated-yellow (illuminated).

The status lights L1 and L3 indicate the present charge status of the two respective batteries 1 and 2. The MBCS 100 is described hereinafter as used in an automotive vehicle, for illustration purposes only, and the voltages given below assume the use of a 12 VDC system. It is understood, however, that the MBCS 100 may be used in a system that operates under other DC voltages. A green status light L1 indicates that the charge state of the first battery 1 is GOOD, that is, that the voltage across the battery terminals is at or above a certain voltage. So, for example, a voltage of 12 V or higher across the terminals of battery 1 will result in the status light L1 indicating a status GOOD, when the battery 1 is not being charged. If the battery 1 is being charged, the status light L1 will indicate status GOOD when the voltage across the terminals is at or above a certain Upper Threshold Value, which, in an automotive application with a 12-Volt battery, is 13.2 V. A red status light L1 indicates that the charge state of the first battery 1 is NOT GOOD, meaning that the voltage across the terminals is not at or is below the voltage level required to be GOOD according to the definition just stated. The status light L3 indicates analogously the voltage state of the second battery 2.

The active lights L2 and L4 indicate the charging states of the respective batteries 1 and 2. When the first battery 1 is connected to the vehicle load 1000 with the engine running, the active light L2 lights yellow Y, indicating that the battery 1 is being charged; when the second battery 2 is connected to the vehicle load with the engine running, the active light L2 lights yellow Y, indicating that the battery 2 is being charged.

The mediator 4 monitors the voltage levels of the first battery 1 and the second battery 2 at the first-battery terminal 7 and the second-battery terminal 8, respectively, and, based on an algorithm programmed into the mediator 4, determines whether the first battery 1, the second battery 2, or both batteries are depleted to the point of having to be placed in a charging state. When the vehicle engine is off, the mediator 4 defaults to SWITCH STATE ONE, in which the alternator terminal 6 is switched to the first-battery terminal 7, thereby connecting the first battery 1 to the load 1000, including the charging source 3, and the second-battery terminal 8 is isolated from the charging source 3, thus, completely isolating the second battery 2 from the load 1000. After the engine is started, the mediator 4 remains in SWITCH STATE ONE, monitoring the voltage level on the first battery 1. Once the charge is at or above the Upper Threshold Value for two and one-half minutes, the mediator 4 switches from SWITCH STATE ONE to SWITCH STATE TWO. This effectively isolates the charged first battery 1 from the load and switches the second battery 2 to the load and to the charging source 3. This switching is done in a make-before-break fashion so as to ensure that there is a continuous buffer across the charging source 3 as the switching occurs. Once in SWITCH STATE TWO, the mediator 4 remains in that state until it determines that the second battery 2 is at or above the Upper Threshold Voltage and has stayed at the Upper Threshold Value for two and one-half minutes, the mediator 4 then switches to SWITCH STATE THREE, placing both batteries across the vehicle load 1000 and maintaining both batteries 1, 2, at full charge by the charging source 3.

Figure 3:
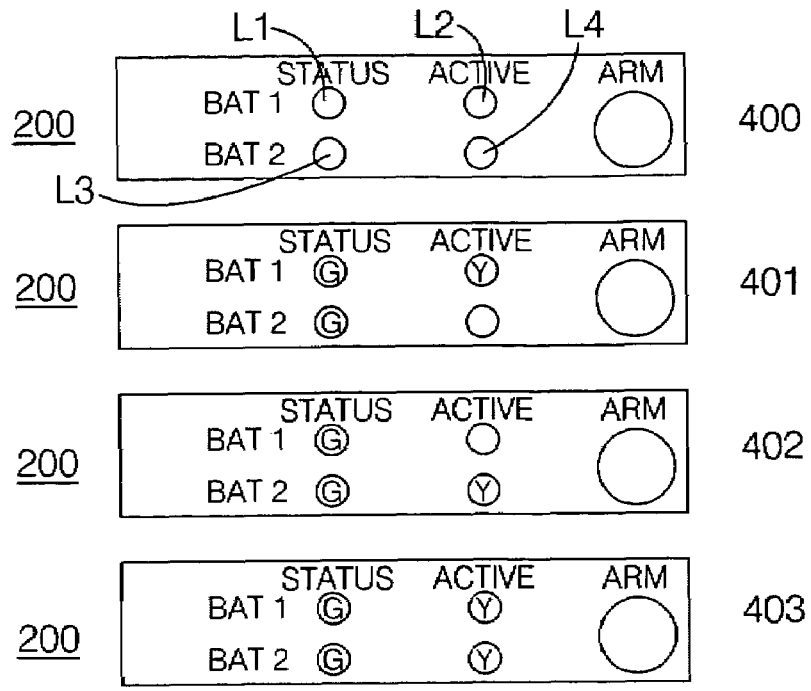
FIG. 3 shows a number of keypad/display unit displays associated with normal operation in the preferred embodiment.

FIG. 3 illustrates the different displays on the keypad/display 200 during normal operation. The status lights L1-L3 illuminate green G or red R, and the active lights L2 and L4 illuminate yellow Y. Absence of a letter indicates non-illumination, that is, non-activation of the indicator light. A zero-state display 400 shows that no lights are activated. This condition indicates that the ignition is OFF and/or the engine not operating. The zero state is a default state when the ignition is OFF. The mediator 4 is actually in SWITCH STATE ONE and the first battery 1 is providing power to any peripheral devices or systems that require continuous electrical power. A first-state display 401 indicates that the mediator 4 is in SWITCH STATE ONE and the ignition is ON and/or the engine running. The status light L1 is illuminated green and the active light L2 illuminated yellow, indicating that the first battery 1 is active, that is, connected to load and being charged, and that the voltage across its terminals is at or above the Upper Threshold Voltage, which is 13.2 V for an active battery. Status light L3 is illuminated green and active light L4 is not illuminated, indicating that the second battery 2 is isolated from the vehicle load and that the voltage across its terminals is at or above a Lower Threshold Voltage, which is 12 V. Similarly, a second-state display 402 indicates that the mediator 4 is in SWITCH STATE TWO. Under normal operating circumstances, this means that the engine is running. The lights L1-L4 indicate that the second battery 2 is active, meaning that it is connected to load and being charged, that its voltage is at or above the Upper Threshold Value, and that the first battery 1 is inactive, but fully charged, with a voltage at or above 12 V. A third-state display 403 indicates that the mediator 4 is in SWITCH STATE THREE with the engine running. In this case, the lights L1-L4 indicate that both batteries 1 and 2 are active, that is, are connected to load and are charging, and that their voltages are above the Upper Threshold Voltage.

Figure 4:
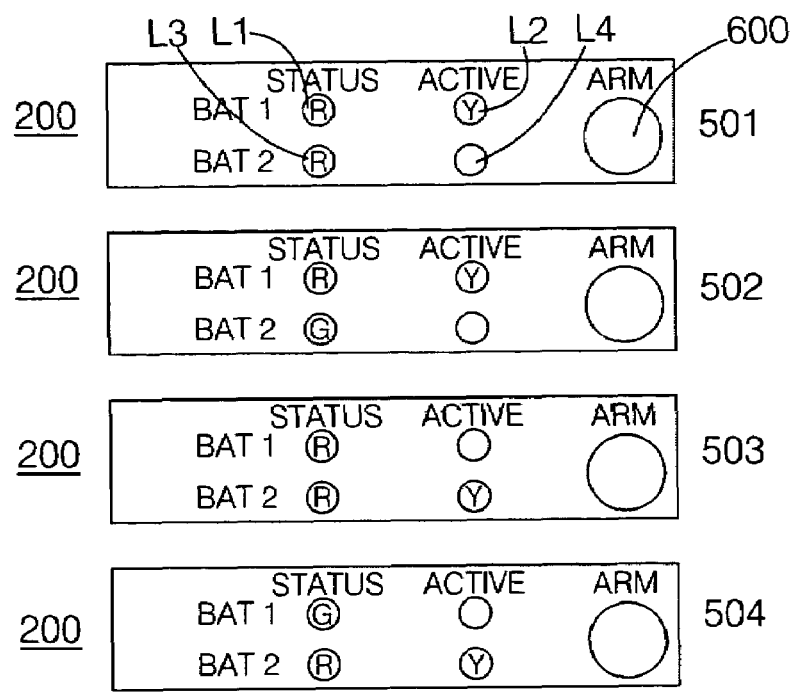
FIG. 4 shows a number of displays associated with low-battery normal operation in the preferred embodiment.

FIG. 4 shows several possible displays on the keypad/display 200 corresponding to various "battery low" situations, that is, situatons in which one or the other of the batteries 1, 2 has become discharged to the point where its voltage is low. A first low-voltage display 501 indicates that the vehicle load including the charging source 3 is connected to first battery 1 (active light L2 is illuminated) and the second battery 2 is isolated (active light L4 is not illuminated). This display corresponds to SWITCH STATE ONE with the engine running. More significantly, the first low-voltage display 501 indicates that both batteries 1, 2 are NOT GOOD (status lights L1 and L3 are illuminated red R). This means that the voltage across the the active battery, that is, the first battery 1, is below 13.2 V and that the voltage across the second battery 2, the inactive battery, is below 12 V. A second low-voltage display 502 also indicates that the mediator 4 is in SWITCH STATE ONE, but now the second battery 2 is above 12 V, while the first battery 1 is still below 13.2 V. A third low-voltage display 503 is similar to the first low-voltage display 501, but the active and inactive batteries are reversed. Now it is the second battery 2 that is active, but with a voltage below 13.2 V and the first battery 1 that is inactive, with a voltage below 12 V. The mediator 4 must therefore be in SWITCH STATE TWO. A fourth low-voltage display 504 indicates that the mediator 4 is in SWITCH STATE TWO, since the first battery 1 is shown to be inactive (active light L2 is not illuminated), and the second battery 2 is shown to be active (active light L4 is illuminated). At the same time, the status light L1 is illuminated green and the status light L3 illuminated red. These facts indicate that the voltage across the first battery 1 is greater than 12 V and the voltage across the second battery 2 is less than 13.2 V. Assuming that in each case the active battery is not defective and has been under charge for a long enough time to bring it to full charge, a plausible explanation for the low-voltage displays shown in FIG. 4 is that the charging source 3 has gone bad. When one or another of the low-voltage situations exists, the MBCS 100 activates an alarm signal 15 to urge the vehicle operator to check the keypad/display 200 to determine exactly the status of the MBCS 100. The alarm signal 15 may be an audible or visual signal, or a combination of both, such as a blinking light mounted on the keypad/display 200 or in some area readily visible to the operator of the vehicle, and emitting an attention-getting beep.

Figure 5:
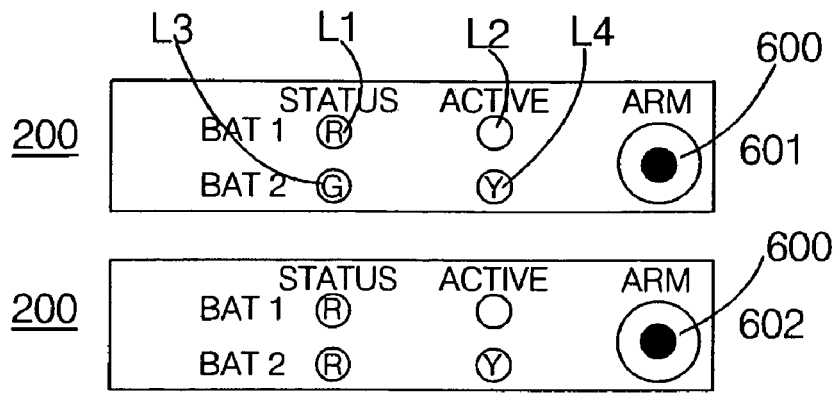
FIG. 5 shows displays associated with low-battery backup operation in the preferred embodiment.

FIG. 5 illustrates two intervention modes that allow the vehicle operator to intervene manually into operation of the MBCS 100 and to override the switch state of the mediator 4. The first mode is an auxiliary mode 601 for switching the second battery 2 in to operate peripheral equipment, such as a wheelchair lift, and the second mode is an emergency mode 602 for an emergency start when both batteries 1 and 2 are low. An arming switch or intervention means 600 (shown as "ARM" on the FIGS. 3, 4, and 5) is provided on the keypad/display 200. Activating the arming switch 600 with the ignition OFF sets the MBCS 100 into the auxiliary mode 601. The status light L1 is illuminated red R, indicating that the first battery 1 is depleted to a level below the Upper Threshold Value for an isolated (inactive) battery (approx. 12 Volts). The status light L3 is illuminated green G, indicating that the second battery 2 is at or above the Upper Threshold Value for a battery that is currently not being charged (ignition is OFF), that is, it as a voltage of 12 V or greater. The auxiliary mode 601 is typically the mode used in order to operate peripheral equipment, such as a wheelchair lift, electric doors, etc. But there are other reasons to request auxiliary mode 601. Perhaps the first battery 1 is depleted, because the lights were left on, for example. Pushing the arming switch 600 (ignition is OFF)

will request the auxiliary mode 601, which will isolate the first battery 1, connect the second battery 2 to load, thereby allowing the operator to start the engine. Once the engine is running (ignition now ON), the MBCS 100 will assume emergency mode 602 was requested (to be discussed below) and the voltage level of the second battery 2 is up to the Upper Threshold Value, the mediator 4 will isolate the second battery 2 and switch in the first battery 1. It will, of course, take a significantly longer time to recharge this depleted first battery 1, than under normal circumstances. The mediator 4 will continue to sample the voltage level until it is at the Upper Threshold Value of 13.2 V. Once at that threshold, the timer will start counting down the two and one-half minutes, to see that the battery is holding its charge. At that point, the mediator 4 will switch to SWITCH STATE THREE and the MBCS 100 will now be back to normal operation.

Another reason may be a missing or shorted battery. If the first battery 1 is missing (for example, stolen, shorted or completely depleted to an extremely low voltage), the operator may push the arming switch 600 to request the auxiliary mode 601. Operation is as described above with the depleted first battery 1, but when the mediator 4 checks to see if the first battery 1 can be switched to load, it will find nothing or a voltage </=2 Volts (shorted battery). The situation is now identical to that of the conventional vehicle with a single battery, i.e., the mediator 4 will not switch a battery into the load if it has a voltage equal to or lower than 2 Volts and, therefore, will operate the vehicle as if it only had one battery.

The emergency mode 602 is the mode used for an emergency starting of the vehicle when the first battery 1 is depleted. Assuming the ignition is ON, the engine is not running, thus, the alternator is not charging, pushing the arming switch 600 puts the MBCS 100 into the emergency mode 602. In the situation shown at 602, the ignition is ON and the status lights L1 and L3 are illuminated red R, indicating that both batteries are below charge, but the first battery 1, being inactive, is below the inactive Upper Threshold Value of 12 V, while the second battery 2 has a voltage lower than the active Upper Threshold Value 13.2 V, because the alternator is not charging it. Thus, the second battery 2, although below a threshold voltage for being switched to load under normal operating conditions, may still have enough to crank the engine. If this low-battery situation occurs with the ignition ON, but the engine not running, activating the arming switch 600 puts the MBCS 100 into the emergency mode 602, wherein the vehicle load is placed across second battery 2, and the first battery 1 is isolated, allowing the operator to attempt to start the vehicle with the second battery 2. This is obviously an emergency move, since if the second battery 2 is run down while unsuccessfully trying to start the engine, there may be insufficient power left to operate the periperal equipment, which in the example given above, is the wheelchair lift, the means of egress for the vehicle operator. In order to prevent this dire situation from occurring, the MBCS 100 allows the load to be connected to the second battery 2 in this emergency mode for two minutes only. After that time, the mediator 4 switches to SWITCH STATE ONE. The emergency mode 602, however, will not allow a battery with a voltage of 9 V or lower to be used to crank the engine. If at any time during the two minutes, the voltage drops below 9 V, the time for cranking the engine will be limited to 10 seconds, before the mediator 4 switches to SWITCH STATE ONE. Once the voltage on the battery drops below 9.0 V, the mediator 4 will allow the operator to call for the auxiliary mode 601 only and will not respond to requests for the emergency mode 602. In other words, once the voltage on the batteries drops to 9.0 V, the mediator 4 will not allow the batteries to be used to crank the engine.

The above discussion presents the basic functioning of the MBCS 100 under operator intervention. In the preferred embodiment, there are a number of additional features mediated by the mediator 4 for added safety. For example, when the operator activates the intervention means 600 with the ignition OFF, putting the MBCS 100 into the auxiliary mode 601 and connecting the second battery 2 to the load, that auxiliary mode 601 will last only for a limited time, typically two minutes, or whatever time is necessary for the peripheral equipment to do its essential work, such as, for example, operating a wheelchair lift. One or more remote arming switches may be provided at convenient locations in the vehicle, so as to allow the operator to reactivate the auxiliary mode 601, in order to complete a task. For this purpose, a remote ARM wire Remote ARM is provided on the mediator 4. It is up to the user or installer of the MBCS 100 to wire the appropriate switches to chassis ground in the appropriate locations of the vehicle. Additional wires may be provided to allow the user to install additional warn devices, particularly high amperage devices. This may be ncessary if the intended operator of the vehicle is hard of hearing, or desires an additional warning signal, in addition to the alarm signal 15 provided on the mediator 4. For example, one of the additional leads may be used to install a bullhorn or a strobe light that is activated when the alarm signal 15 is activated.

For purposes of illustration, the arming switch 600 is shown as a push-button actuator. In reality, many types of actuators may serve as the arming switch 600. Mechanical switch devices are the most common types of suitable devices, but voice-activated switches may also be suitable, particularly when the MBCS 100 is installed in a vehicle operated by a person by with only limited ability to physically activate a mechanical switch.

Should the operator desire to use the intervention means 600, while both batteries are in good condition, fully charged for the particular state, the mediator 4 will switch the second battery 2 to load and isolate the first battery 1, but the status lights of both batteries 1 and 2 will illuminate green.

Figure 7:
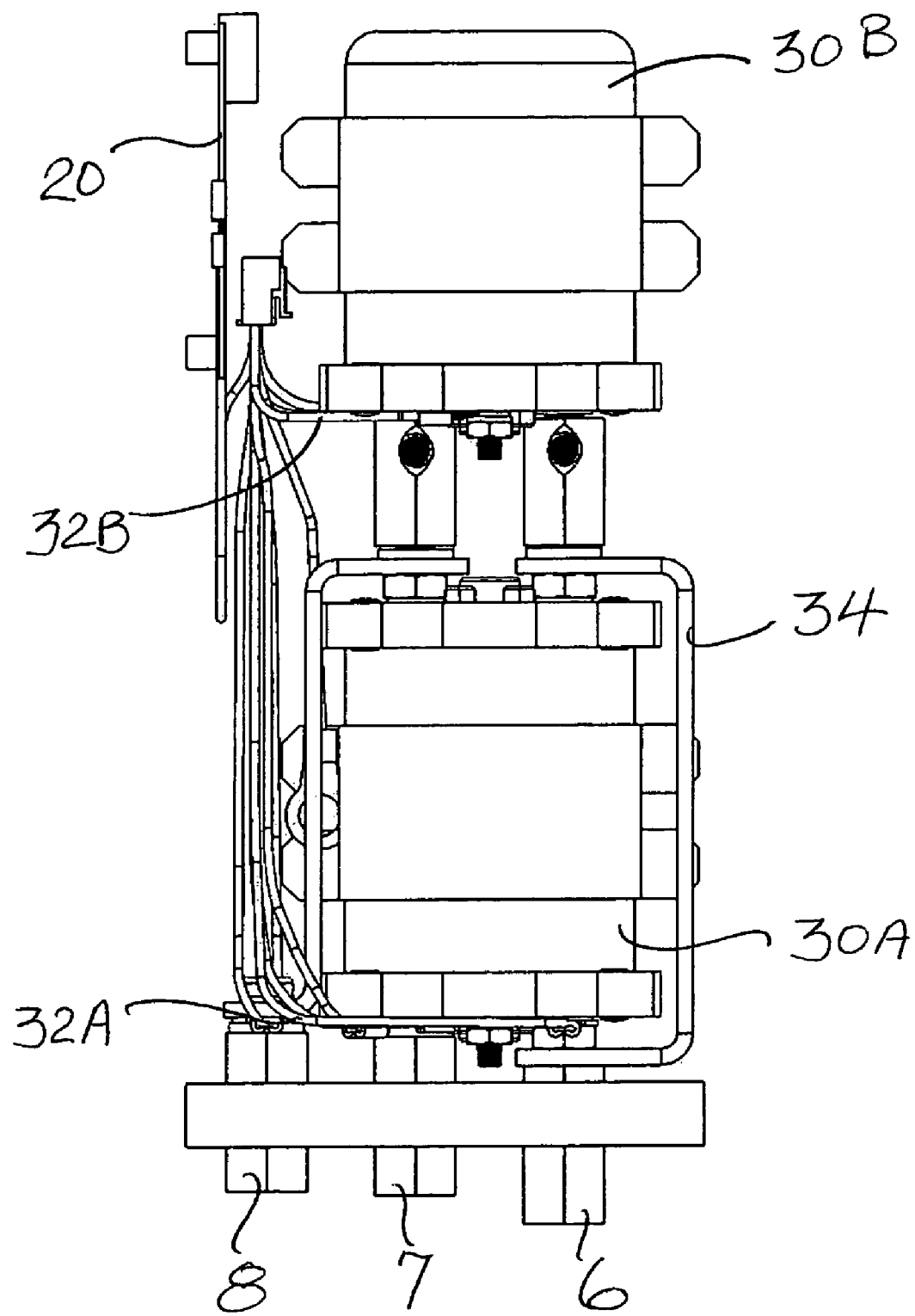
FIG. 7 is an illustration of an embodiment of the mediator, showing the contactors, battery terminals, and leads from the CPU.
Figure 8:
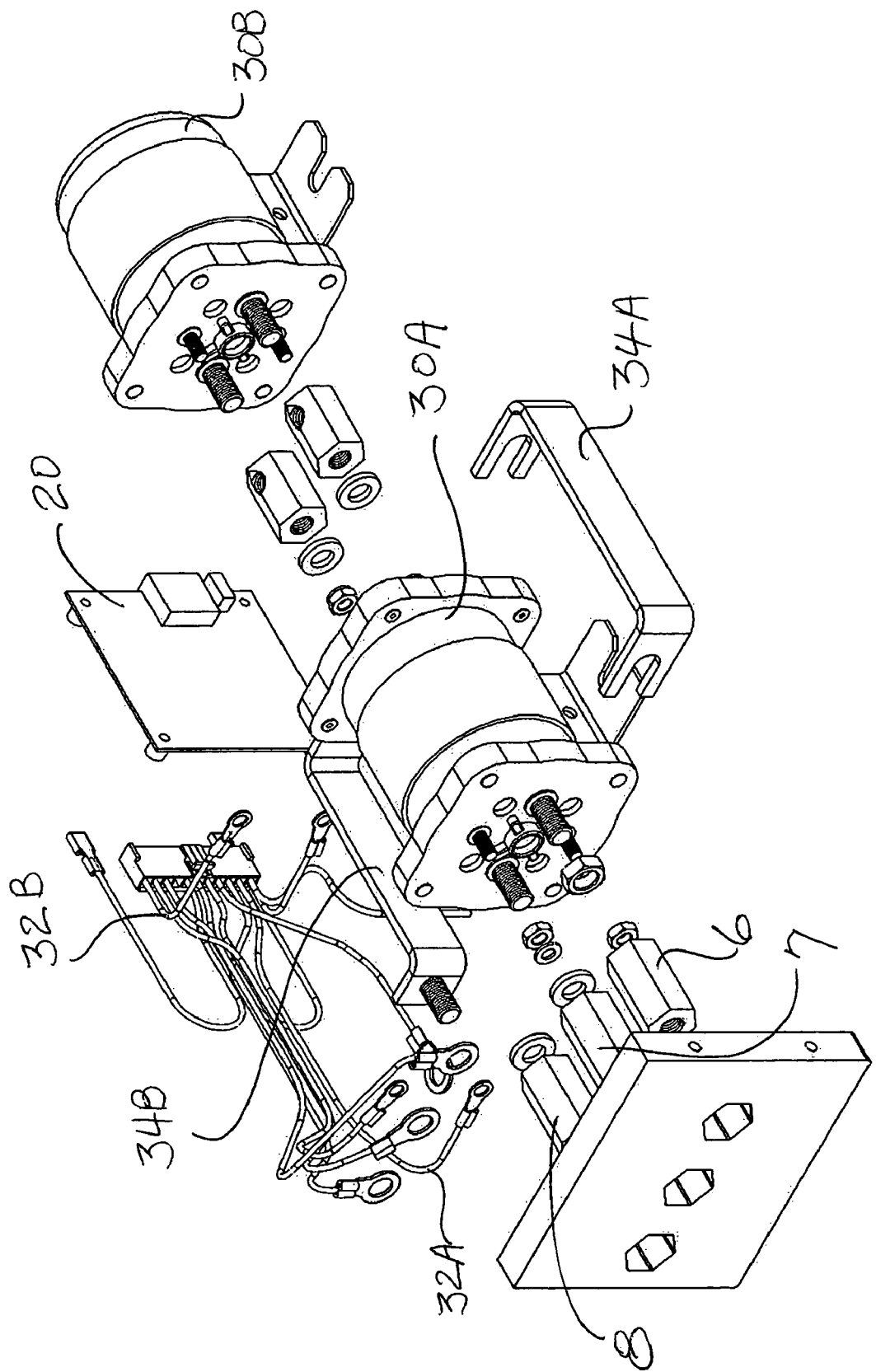
FIG. 8 is a partially exploded view of the mediator of FIG. 7.

FIG. 7 is an illustration of an actual embodiment of the mediator 4, showing the contactors 30, the terminals 6, 7, 8 for the batteries 1 and 2, and the charging source 3, and leads from the CPU 20 for the monitoring subcircuits 22 and the switching circuits 32. Also shown are the conductors 34, which are steel conductor bars, capable of conducting 200 amperes. The overall dimensions of the mediator 4 as shown are approximately 9 in. L×4 in. W×4 in. H. The mediator 4 is shown here as a unit that can be enclosed in a box, to be mounted on a wall within the passenger area of the vehicle. It is also possible, of course, to use certain components that are already available in the conventional vehicle, to provide the MBCS 100 according to the invention. For example, most conventional vehicles are already equipped with a CPU and contact devices, such as relays or solenoids. Some conventional vehicles, particularly tow vehicles, are already equipped with these devices, plus a second battery. This second battery is meant to provide power to devices in a towed vehicle, and is not incorporated into the electrical system of the conventional vehicle in a manner that allows it to serve as a back-up battery to start the tow vehicle engine. According to the present invention, that second battery may be hooked up to the mediator 4 and serve as the second battery 2 described in this disclosure. Furthermore, the CPU in the conventional vehicle may also serve as the CPU 20 of the present invention, assuming that the programming with the algorithms that control the switching between SWITCH STATE ONE, SWITCH STATE TWO, and SWITCH STATE THREE can be incorporated into that CPU. In this case, the MBCS 100 does not need to be provided as a unit that is subsequently mounted in a vehicle, but, incorporated into the manufacturing process of the vehicle, the electrical components of the MBCS 100, such as the contactors, the monitoring subcircuits, and the switching circuits, may be installed in the engine compartment, for example, with the keypad/display unit 200 incorporated into the construction of the dash.

Although the discussion in this section has avoided the repeated use of the designator "preferred embodiment," it should be born in mind that all of the specific details given relate to the preferred embodiment and are not limitations on the more general practice of the invention described and claimed in this document. The invention is particularly subject to many different embodiments, many of which will be obvious to practitioners skilled in the art to which the invention relates.

What is claimed is:

1. A multiple-battery management system for maintaining a charge on multiple batteries in a vehicle, said multiple-battery management system comprising:

a vehicle having a vehicle load that includes a charging source, an engine, a storage battery, and peripheral devices, wherein, when said engine is running, said charging source provides electrical power for operating said engine, said peripheral devices, and for charging said storage battery, a plurality of storage batteries; and a mediator device that includes a programmable control means for receiving voltage data from said plurality of storage batteries, and switch circuitry for automatically switching one of said storage batteries to said vehicle load, and an arming switch for enabling manual intervention of said switch circuitry, wherein said switch circuitry has a charging source connector that is adapted for connecting to said charging source and a battery connector for selectively connecting each storage battery of said plurality of storage batteries electrically to said charging source;

wherein, in a standard operating mode, said mediator device switches between four switch states that include:

a switch state zero, in which an ignition system is in an OFF position and said vehicle engine is not running, and in which said first battery is connected to said charging source, provides voltage to said vehicle load and is available to provide a cranking voltage for starting said vehicle engine, a switch state one, in which said engine is running and said first battery is electrically switched to said vehicle load and is being charged by said charging source and said second battery is electrically isolated from said vehicle load, a switch state two, in which said engine is running and said first battery is electrically isolated from said vehicle load and said second battery is switched to said vehicle load and is being charged by said charging source, and a switch state three, wherein, when said first battery and said second battery are both full charged, said first battery and said second battery are switched in parallel to said vehicle load and are being charged by said charging source, so as to maintain a fully charged level of both batteries.

2. The multiple-battery management system of claim 1, further comprising a display means for indicating a voltage status of said each storage battery.

3. The multiple-battery management system of claim 2, wherein said display means includes a means for displaying an active status of said each storage battery.

4. The multiple-battery management system of claim 1, wherein said battery connector includes a plurality of battery connectors that correspond in number to a number of storage batteries in said plurality of storage batteries, wherein each said battery is connectible to a corresponding one battery connector, and wherein said switch circuitry has a plurality of contactors that are selectively switchable to make a connection with one or more of said plurality of battery connectors such that said switch circuitry is electrically connected between said charging source and said one or more of said each said battery.

5. The multiple-battery management system of claim 1, wherein, before switching from said switch state one to said switch state two, said second battery is switched to said vehicle load before said first battery is isolated from said vehicle load in a make-before-break sequence to prevent arcing.

6. The multiple-battery management system of claim 1, wherein, when said arming switch is activated when an ignition system for said engine is in an OFF position, said mediator device calls for a first emergency mode of operation that switches said second battery to said vehicle load and then isolates said first battery from said vehicle load.

7. The multiple-battery management system of claim 1, wherein when said arming switch is activated when an ignition system for said engine is in an ON position, said mediator device calls for a second emergency mode of operation that switches said second battery to said vehicle load and then isolates said first battery from said vehicle load, and, if said voltage data for said second battery indicates a voltage charge that is above a minimum cranking voltage, allows said second battery to crank said engine for a limited period of time.

8. The multiple-battery management system of claim 7, wherein, when said voltage on said second battery drops below said minimum cranking voltage value, said mediator device interrupts said second emergency mode of operation and switches to switch state one.

* * * * *